United States Patent
Yamada

(10) Patent No.: US 11,667,801 B2
(45) Date of Patent: Jun. 6, 2023

(54) SET OF COMPOSITIONS FOR INK JET TEXTILE PRINTING AND METHOD FOR INK JET TEXTILE PRINTING

(71) Applicant: Seiko Epson Corporation, Tokyo (JP)

(72) Inventor: Minoru Yamada, Shiojiri (JP)

(73) Assignee: SEIKO EPSON CORPORATION

( * ) Notice: Subject to any disclaimer, the term of this patent is extended or adjusted under 35 U.S.C. 154(b) by 309 days.

(21) Appl. No.: 16/768,141

(22) PCT Filed: Nov. 22, 2018

(86) PCT No.: PCT/JP2018/043268
§ 371 (c)(1),
(2) Date: May 29, 2020

(87) PCT Pub. No.: WO2019/107284
PCT Pub. Date: Jun. 6, 2019

(65) Prior Publication Data
US 2020/0317942 A1    Oct. 8, 2020

(30) Foreign Application Priority Data

Nov. 30, 2017 (JP) .............................. JP2017-230379
Sep. 11, 2018 (JP) .............................. JP2018-169929

(51) Int. Cl.
C09D 11/322    (2014.01)
B41J 2/01    (2006.01)
C09D 11/54    (2014.01)
D06P 5/08    (2006.01)

(52) U.S. Cl.
CPC .............. *C09D 11/322* (2013.01); *B41J 2/01* (2013.01); *C09D 11/54* (2013.01); *D06P 5/08* (2013.01)

(58) Field of Classification Search
CPC ....... C09D 11/322; C09D 11/54; C09D 11/30; C09D 11/40; B41J 2/01; B41J 3/4078; B41J 2/2107; D06P 5/30
See application file for complete search history.

(56) References Cited

U.S. PATENT DOCUMENTS 6,432,519 B1    8/2002   Kazama et al.
2010/0279035 A1 *    11/2010   Namba ................. B41M 5/506
                                                    106/31.13

FOREIGN PATENT DOCUMENTS

JP    2000-355163 A    12/2000
JP    2009215506 A  *  9/2009
JP    2010-150453 A    7/2010
(Continued)

*Primary Examiner* — Jannelle M Lebron
(74) *Attorney, Agent, or Firm* — Harness, Dickey & Pierce, P.L.C.

(57) ABSTRACT

A set of compositions for ink jet textile printing includes an ink composition and a coating composition, the ink composition containing a pigment, resin particles, and water, and the coating composition containing resin particles and water. The resin particles contained in the ink composition contain any of a urethane resin, a polycarbonate resin, an acrylic resin, and a styrene resin. The amount of the resin particles in the ink composition is from 1 to 5 parts by mass on a solids basis per part by mass of the pigment on a solids basis. The Young's modulus of dried film of the ink composition is from 1 to 25 MPa, and that of dried film of the coating composition is 50 MPa or less and higher than that of dried film of the ink composition.

13 Claims, 1 Drawing Sheet

(56) References Cited

FOREIGN PATENT DOCUMENTS

| JP | 2013-221141 A | 10/2013 |
| JP | 2017-150125 A | 8/2017 |

\* cited by examiner

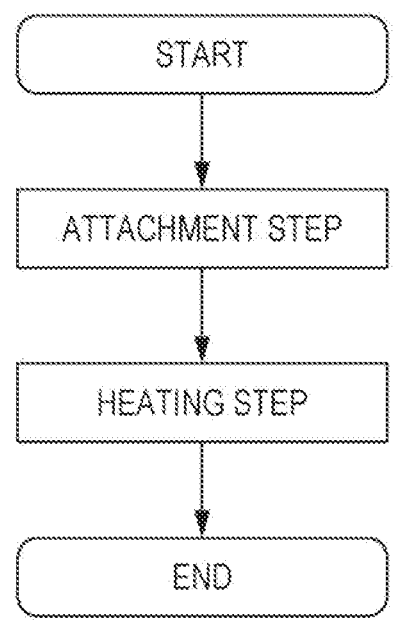

SET OF COMPOSITIONS FOR INK JET TEXTILE PRINTING AND METHOD FOR INK JET TEXTILE PRINTING

CROSS REFERENCE TO RELATED APPLICATIONS

This application is a U.S. National Stage Application of International Application No. PCT/JP2018/043268, filed on Nov. 22, 2018, and published in Japanese as WO 2019/107284 A1 on Jun. 6, 2019, which claims priority to Japanese Patent Application Nos. 2018-169929, filed on Sep. 11, 2018 and 2017-230379, filed on Nov. 30, 2017. The entire disclosures of the above applications are incorporated herein by reference.

TECHNICAL FIELD

The present invention relates to a set of compositions for ink jet textile printing and also to a method for ink jet textile printing.

BACKGROUND ART

Ink jet recording has been making rapid progress in various fields as a technology by which high-definition images can be recorded with relatively simple equipment. Many studies on it are ongoing to enable more stable production of high-quality recordings.

For example, PTL 1 discloses an ink set for ink jet printing with the aim of providing an ink jet ink that delivers excellent quality in textile printing, is superior in ejection stability, and has high fastness to rubbing for use with textiles. The ink set includes a color ink and an overcoat liquid. The color ink contains a colorant, and the overcoat liquid contains a polyester resin and substantially no colorant.

CITATION LIST

Patent Literature

PTL 1: Japanese Unexamined Patent Application Publication No. 2013-221141

SUMMARY OF INVENTION

Technical Problem

When such an ink set as described in PTL 1 is used to perform for ink jet textile printing, a coating liquid as the overcoat liquid is attached to an ink composition as the color ink on a recording medium that includes a fabric. The resulting printing is superior in fastness to rubbing but not sufficiently good in feel and texture.

The present invention was made to solve at least part of this problem, and its object is to provide a set of compositions for ink jet textile printing that gives a printing superior in feel and texture and fastness to rubbing.

Solution to Problem

After extensive research to solve the above problem, the inventors found that a certain set of compositions for ink jet textile printing gives a printing superior in feel and texture and fastness to rubbing. The set includes an ink composition and a coating composition, the ink composition containing a pigment, resin particles, and water, and the coating composition containing resin particles and water. The resin particles contained in the ink composition contain a particular resin, and the amount of the resin particles in the ink composition is in a particular range. The Young's moduli of dried films of the ink and coating compositions are each in a particular relationship. Based on these findings, the inventors completed the present invention.

That is, the present invention is a set of compositions for ink jet textile printing that includes an ink composition and a coating composition. The ink composition contains a pigment, resin particles, and water, and the coating composition contains resin particles and water. The resin particles contained in the ink composition contain any of a urethane resin, a polycarbonate resin, a (meth)acrylic resin, and a styrene resin. The amount of the resin particles in the ink composition is from 1 to 5 parts by mass on a solids basis per part by mass of the pigment on a solids basis. The Young's modulus of dried film of the ink composition is from 1 to 25 MPa, and that of dried film of the coating composition is 50 MPa or less and higher than that of dried film of the ink composition. The inventors believe the following is one, but not the only, reason why such a set of compositions for ink jet textile printing solves the problem postulated in the present invention. That is, when an ink composition is used alone, without a coating composition, as in the related art, the printing is not superior in fastness to rubbing, for example because the ink composition, containing a pigment, attached to a recording medium has part of the pigment at its surface, and this surface pigment exfoliates when rubbed. A known set of compositions including a pigment-containing ink composition and a coating composition provides superior fastness to rubbing when the ink composition first and then the coating composition are attached to a recording medium. This owes to the presence of the coating composition, substantially free of pigments, on the surface. With a coating composition that forms film having a high Young's modulus, however, the known set of compositions only gives a printing superior in fastness to rubbing but not sufficiently good in feel and texture. With a coating composition that forms film having a low Young's modulus, the known set of compositions only gives a printing superior in feel and texture but not sufficiently good in fastness to rubbing. A set of compositions according to the present invention for ink jet textile printing, by contrast, gives a printing that is superior in feel and texture primarily because the Young's modulus of dried film of the coating composition is 50 MPa or less, and also in fastness to rubbing by virtue of the fact that the Young's modulus of dried film of the coating composition is higher than that of dried film of the ink composition.

Preferably, the set of compositions according to the present invention for ink jet textile printing further has the following configurations.

It would be preferred that the Young's modulus of dried film of the ink composition be from 1 to 20 MPa.

It would be preferred that the Young's modulus of dried film of the ink composition be from 5 to 20 MPa.

It would be preferred that the Young's modulus of dried film of the coating composition be higher than that of dried film of the ink composition by 5 to 25 MPa.

It would be preferred that the Young's modulus of dried film of the coating composition be from 5 to 50 MPa.

It would be preferred that the resin particles contained in the ink composition contain a resin having at least one crosslinking group.

It would be more preferred that the crosslinking group include any of a blocked isocyanate group and the silanol group.

It would be more preferred that the resin particles contained in the ink composition contain a urethane resin having a polycarbonate backbone.

It would be preferred that the amount of the resin particles in the coating composition be from 0.1% to 10% by mass, on a solids basis, of the total amount of the coating composition.

It would be preferred that the ink composition or coating composition further contain a lubricant.

It would be preferred that the ink composition contain at least one organic solvent, and that the organic solvent include any of 1,3-propanediol, 1,4-butanediol, and 1,5-pentanediol.

It would be preferred that the coating composition be a composition for being applied to a recording medium by dipping.

In addition, the present invention has a step of attaching the ink and coating compositions included in a set of compositions according to the present invention for ink jet textile printing to a recording medium including a fabric.

BRIEF DESCRIPTION OF DRAWINGS

FIG. 1 is a flowchart illustrating an example of a textile printing method according to the present invention.

DESCRIPTION OF EMBODIMENTS

The following describes embodiments of the present invention (hereinafter each referred to as "an embodiment") in detail, referring to the drawing as necessary. The present invention is not limited to these, and various modifications can be made without departing from the scope of the invention. "(Meth)acrylic resin" as used herein includes both an acrylic resin and the corresponding methacrylic resin.

"Textile printing" as used herein refers to recording (printing) something with ink on a recording medium that includes a fabric. "Ink jet textile printing" refers to recording (printing) something with an ink composition on a recording medium that includes a fabric by ink jet technology and is a kind of ink jet recording. "Printing" refers to a recording medium that includes a fabric on which an image has been formed by recording with an ink composition.

[Set of Compositions for Ink Jet Textile Printing]

A set of compositions according to an embodiment for ink jet textile printing (Hereinafter also simply referred to as "the set of compositions.") includes an ink composition and a coating composition, the ink composition containing a pigment, resin particles (Hereinafter also referred to as the first resin particles), and water, and the coating composition containing resin particles (Hereinafter also referred to as the second resin particles) and water. The first resin particles contain any of a urethane resin, a polycarbonate resin, a (meth)acrylic resin, and a styrene resin, and the amount of the first resin particles is from 1 to 5 parts by mass on a solids basis per part by mass of the pigment (on a solids basis). The Young's modulus of dried film of the ink composition is from 1 to 25 MPa. The Young's modulus of dried film of the coating composition is 50 MPa or less and higher than that of dried film of the ink composition. The following appears to be the reason why such a set of compositions for ink jet textile printing can obtain a printing superior in feel and texture and fastness to rubbing, although this is not the only reason. That is, when an ink composition is used alone, without a coating composition, as in the related art, the printing is not superior in fastness to rubbing, for example because the ink composition, containing a pigment, attached to a recording medium has part of the pigment at its surface, and this surface pigment exfoliates when rubbed. A known set of compositions including a pigment-containing ink composition and a coating composition provides superior fastness to rubbing when the ink composition first and then the coating composition are attached to a recording medium, by virtue of the presence of the coating composition, which is substantially free of pigments, on the surface. With a coating composition that forms film having a high Young's modulus, however, the known set of compositions only gives a printing superior in fastness to rubbing but not sufficiently good in feel and texture. With a coating composition that forms film having a low Young's modulus, the known set of compositions only gives a printing superior in feel and texture but not sufficiently good in fastness to rubbing. The set of compositions according to this embodiment for ink jet textile printing, by contrast, gives a printing that is superior in feel and texture, which is primarily because the Young's modulus of dried film of the coating composition is 50 MPa or less, and also in fastness to rubbing, which owes to the fact that the Young's modulus of dried film of the coating composition is higher than that of dried film of the ink composition. The set of compositions according to this embodiment for ink jet textile printing is also superior in ejection stability.

[Ink Composition]

The ink composition in this embodiment contains a pigment, resin particles, and water and, in addition these, can optionally contain other ingredients as necessary.

The Young's modulus of dried film of the ink composition is from 1 to 25 MPa, preferably from 1 to 20 MPa, preferably from 5 to 25 MPa, more preferably from 5 to 20 MPa. By virtue of the Young's modulus of the film being 25 MPa or less, the ink composition gives good feel and texture to the resulting printing. By virtue of the Young's modulus of the film being 1 MPa or more, the ink composition gives a printing superior in fastness to rubbing owing to its good adhesion to fibers of the fabric that is the recording medium, and also is superior in storage stability owing to its good dispersibility. The Young's modulus of the film can be adjusted to be in these ranges by customizing the ingredients of the ink composition, detailed later herein, and their amounts, in particular the resin particles and their amount, as necessary. The Young's modulus of the film is measured according to the method described in Examples.

As mentioned herein, dried film of an ink composition represents a film obtained by drying the ink composition. A specific example of a film is obtained as follows: On a flat substrate, such as of metal or glass, a mold having an opening measuring 3×19 cm is made to a height sufficient to serve as a rectangular well. Ten grams of the ink composition is cast into the mold. After overnight drying in the atmosphere, the composition is heated at 160° C. and 15 minutes, and then the ink film is collected by removing it from the substrate. More specifically, the film can be prepared by the method described in Examples below.

<Pigment>

The pigment in this embodiment may be particles containing the pigment. Examples of pigments include, but are not limited to, the following.

Examples of carbon blacks, for black ink, include, but are not limited to, Bonjetblack CW-1 (Orient Chemical Industries), No. 2300, No. 900, MCF88, No. 33, No. 40, No. 45, No. 52, MA7, MA8, MA100, No. 2200B, etc. (Mitsubishi Chemical Corporation), Raven 5750, Raven 5250, Raven 5000, Raven 3500, Raven 1255, Raven 700, etc. (Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, etc. (CABOT JAPAN K.K.), and Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (Degussa).

Examples of pigments for white ink include, but are not limited to, C.I. Pigment White 6, 18, and 21, titanium oxide, zinc oxide, zinc sulfide, antimony oxide, and zirconium oxide, and white hollow resin particles and polymer particles.

Examples of pigments for yellow ink include, but are not limited to, EMACOL SF Yellow J701F (trade name of a Sanyo Color Works product) and C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of pigments for magenta ink include, but are not limited to, C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:5, 57:1, 88, 112, 114, 122, 123, 144, 146, 149, 150, 166, 168, 170, 171, 175, 176, 177, 178, 179, 184, 185, 187, 202, 209, 219, 224, and 245 or C.I. Pigment Violet 19, 23, 32, 33, 36, 38, 43, and 50.

Examples of pigments for cyan ink include, but are not limited to, C.I. Pigment Blue 1, 2, 3, 15, 15:1, 15:2, 15:3, 15:34, 15:4, 16, 18, 22, 25, 60, 65, and 66, C.I. Vat Blue 4 and 60, and C.I. Direct Blue 199.

Examples of other pigments include, but are not limited to, C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

The average particle diameter of the pigment is preferably 50 nm or more and 300 nm or less, more preferably 55 nm or more and 200 nm or less, even more preferably 60 nm or more and 150 nm or less, still more preferably 65 nm or more and 100 nm or less. The use of pigment particles having an average diameter in any of these ranges tends to make the ink composition better in ejection stability and, furthermore, tends to help obtain a printing better in fastness to rubbing.

The average diameters of particles given herein are by volume unless explicitly stated otherwise. As for measurement, an example of a possible method is to dilute a sample with purified water to a solids concentration of 0.1% by mass and then analyze the diluted sample at 25° C. using Zetasizer Nano ZS zeta potential, particle size, and molecular weight measuring system (Malvern).

The average diameter of the pigment particles can be adjusted by customizing, for example, the stirring speed duration and the dispersant and its amount in the step of dispersing the pigment. The manufacturer can obtain the desired liquid dispersion by measuring the average diameter of the resulting pigment particles and readjusting it based on the number of orders of magnitude. Alternatively, it is also possible to use commercially available pigment particles with a known average diameter. The manufacturer is not limited to these methods and can adjust the average diameter of the pigment particles in whatever way possible.

The pigment content of the ink composition is preferably from 1.0% to 15% by mass, more preferably from 2.0% to 10% by mass, even more preferably from 3.0% to 7.0% by mass, on a solids basis, of the total amount (100% by mass) of the ink composition. When the amount of pigment particles is in any of these ranges, the ink composition tends to be better in ejection stability.

<Resin Particles>

The resin particles contained in the ink composition in this embodiment are particles containing at least one resin (Hereinafter also referred to as "resin dispersion" or "resin emulsion."). In the following, the descriptions of particles using the words of "resin particles" rather than the explicit identification of "the first resin particles" describe the particles together with the descriptions of the second resin particles, which will be provided later herein.

Resin particles in this embodiment may be resin particles of self-dispersible type with an introduced hydrophilic moiety, required for stable dispersion in water (self-dispersible resin particles), or may be resin particles that become dispersible in water with the use of an external emulsifier. However, it is preferred that the resin particles be a self-emulsifying resin dispersion to ensure that their reaction with a polyvalent metal compound, which can be contained in the recording medium and will be described later herein, will not be inhibited.

The resin can be, for example, a urethane resin, polycarbonate resin, (meth)acrylic resin (e.g., Mowinyl 6760 (trade name of a Nippon Synthetic Chemical Industry product), an acrylic resin), styrene resin, silicone resin, styrene acrylic resin, fluorene resin, polyolefin resin, rosin-modified resin, terpene resin, polyester resin, polyamide resin, epoxy resin, vinyl chloride resin, vinyl chloride-vinyl acetate copolymer, or ethylene vinyl acetate resin. One of these resins may be used alone, or two or more may be used in combination. Of these, it is particularly preferred that the first resin particles contain any of a urethane resin, a polycarbonate resin, a (meth)acrylic resin, and a styrene resin, more preferably a urethane resin, to ensure a suitable Young's modulus of film.

A urethane resin is a resin that has the urethane linkage in its molecule. The urethane resin is preferably an anionic urethane resin, which has a carboxy, sulfo, hydroxy, or other anionic functional group, for storage stability of the ink and to improve reactivity with any polyvalent metal compound contained in a pretreatment agent, which will be described later herein.

Examples of urethane resins include polyether urethane resins, which contain, besides the urethane linkage, the ether linkage in their backbone, polyester urethane resins, which contain the ester linkage in their backbone, and polycarbonate urethane resins, which contain the carbonate linkage in their backbone. Multiple kinds of these urethane resins can be used in combination. To give dried film of the ink composition a relatively high Young's modulus and thereby give it good fastness to rubbing, urethane resins that contain the carbonate linkage in their backbone, i.e., have a polycarbonate backbone, are preferred.

Examples of commercially available urethane resins include ETERNACOLL UW-1501F and UW-5002 (trade names of Ube Industries products), TAKELAC WS-5000, W-6061, W-6110, WS-5984, and WS-5100 (trade names of Mitsui Chemicals products), PERMARIN UA-150 and UA-200 and UCOAT UX-390 (trade names of Sanyo Chemical Industries products), and HYDRAN WLS-210 (trade name of a DIC product).

A polycarbonate resin is a resin that has the polycarbonate linkage in its molecule. When no urethane resin is used, it is preferred to use a polycarbonate resin instead.

Examples of commercially available silicone resins include POLON-MF014, POLON-MF-18T, POLON-MF-33, and KM-2002-T (trade names of Shin-Etsu Silicone products) and WACKER FINISH WR1100 and NP2406 and POWERSOFT FE 55 and TS2406 (trade names of Asahi Kasei products).

Resin particles in this embodiment preferably contain a resin that has at least one crosslinking group. The presence of a resin that has crosslinking group(s) tends to make the finished printing better in fastness to rubbing as a result of crosslinking between resin particles. The crosslinking group can be of any kind(s) that crosslinks resin particles, but preferably includes any of a blocked isocyanate group and the silanol group to ensure better fastness to rubbing (wet), which will be described later herein. Resins that have such crosslinking group(s) can be selected from those mentioned in Examples below and from the resins mentioned above.

The resin particles preferably contain 1.0% by mass or more and 5.0% by mass or less, more preferably 1.5% by mass or more and 4.2% by mass, even more preferably 2.0% by mass or more and 3.5% by mass or less, still more preferably 2.5% by mass or more and 3.0% by mass or less urethane resin per 1.0 part by mass of the pigment particles, described above, in the ink composition. The presence of a urethane resin in an amount in any of these ranges tends to help obtain a printing better in fastness to rubbing.

(Meth)acrylic resin refers to a resin that has a (meth) acrylic backbone. Examples of (meth)acrylic resins include, but are not limited to, polymers of (meth)acrylic monomers, such as (meth)acrylic acid and (meth)acrylates, and copolymers of a (meth)acrylic monomer and an extra monomer. The extra monomer can be, for example, a vinyl monomer, such as styrene. "(Meth)acrylic" as used herein is a concept that includes both "methacrylic" and "acrylic."

The average diameter of resin particles is preferably 10 nm or more and 300 nm or less, more preferably 30 nm or more and 100 nm or less, even more preferably 50 nm or more and 80 nm or less. The use of resin particles having an average diameter in any of these ranges tends to make the composition better in ejection stability and, furthermore, tends to help obtain a printing better in fastness to rubbing.

The average diameter of resin particles can be measured by a method similar to that described as a method for measuring the average diameter of pigment particles.

The average diameter of resin particles can be adjusted by, for example, customizing the amounts of monomers in the liquid phase, the duration of reaction, the stirring speed, and the emulsifier and its amount in the synthesis of the resin or the stirring speed duration and the amount of emulsifier in the step of dispersing the resin. The manufacturer can obtain the desired liquid dispersion by measuring the average diameter of the resulting resin particles and readjusting it based on the result. Alternatively, it is also possible to use commercially available resin particles with a known average diameter. The manufacturer is not limited to these methods and can adjust the average diameter of resin particles in whatever way possible.

The amount of the first resin particles is from 1 to 5 parts by mass, preferably from 1.5 to 4.5 parts by mass, more preferably from 2 to 4 parts by mass on a solids basis per part by mass of the pigment (on a solids basis). The presence of the first resin particles in an amount in any of these ranges makes the ink composition superior in ejection stability and, furthermore, helps obtain a printing superior in feel and texture and fastness to rubbing.

The amount of the first resin particles is preferably from 5.0% to 20% by mass, more preferably from 7.0% to 15% by mass, more preferably from 8.0% to 13% by mass, still more preferably from 9.0% to 10% by mass, on a solids basis, of the total amount (100% by mass) of the ink composition. The presence of the first resin particles in an amount in any of these ranges tends to make the ink composition better in ejection stability and storage stability and, furthermore, tends to help obtain a printing better in fastness to rubbing.

<Water>

Water in this embodiment can be, for example, of a type from which ionic impurities have been removed to the lowest possible levels, such as ion exchange water, ultrafiltered water, reverse osmosis water, distilled water, or any other type of purified water or ultrapure water. The use of sterilized water, for example sterilized by ultraviolet irradiation or adding hydrogen peroxide, helps prevent fungal and bacterial development when the condensate is stored long. This tends to further improve storage stability.

<Organic Solvent>

Preferably, the ink composition in this embodiment further contains at least one organic solvent. The organic solvent can be any organic solvent(s) that can be used with water.

Examples of organic solvents include, but are not limited to, cyclic nitrogen compounds, aprotic polar solvents, monoalcohols, alkyl polyols, and glycol ethers.

Examples of aprotic polar solvents include, but are not limited to, cyclic ketone compounds, linear ketone compounds, and linear nitrogen compounds. Typical examples of cyclic nitrogen compounds and aprotic polar solvents include solvents that are pyrrolidones, imidazolidinones, sulfoxides, lactones, amide ethers, and imidazoles. A pyrrolidone can be of any kind that has the pyrrolidone structure, but examples include 2-pyrrolidone, N-alkyl-2-pyrrolidone, and 1-alkyl-2-pyrrolidone. An example of an imidazolidinone is 1,3-dimethyl-2-imidazolidinone, an example of a sulfoxide is dimethyl sulfoxide, an example of a lactone is γ-butyrolactone, and examples of imidazoles include imidazole, 1-methylimidazole, 2-methylimidazole, and 1,2-dimethylimidazole.

Examples of monoalcohols include, but are not limited to, methanol, ethanol, n-propyl alcohol, iso-propyl alcohol, n-butanol, 2-butanol, tert-butanol, iso-butanol, n-pentanol, 2-pentanol, 3-pentanol, and tert-pentanol.

Examples of alkyl polyols include, but are not limited to, glycerol, ethylene glycol, diethylene glycol, triethylene glycol, propylene glycol (1,2-propanediol), dipropylene glycol, trimethylolpropane, 1,3-propylene glycol (1,3-propanediol), isobutylene glycol (2-methyl-1,2-propanediol), 1,2-butanediol, 1,3-butanediol, 1,4-butanediol, 2-butene-1,4-diol, 1,2-pentanediol, 1,5-pentanediol, 2-methyl-2,4-pentanediol, 1,2-hexanediol, 1,6-hexanediol, 2-ethyl-1,3-hexanediol, 1,7-heptanediol, and 1,8-octanediol. Of these, it is particularly preferred that the organic solvent in the ink composition contain include any of 1,3-propanediol, 1,4-butanediol, and 1,5-pentanediol to ensure superior storage stability. A known ink composition that contains resin particles and an organic solvent can thicken or become contaminated as a result of the dissolution of resin particles in the organic solvent when the Young's modulus of dried film of the ink composition is from 1 to 25 MPa. An ink composition according to this embodiment containing resin particles and at least one organic solvent, by contrast, tends to be superior in storage stability even when the Young's modulus of dried film of the ink composition is from 1 to 25 MPa, as long as the organic solvent includes any of 1,3-propanediol, 1,4-butanediol, and 1,5-pentanediol. The suitable degree of hydrophilicity prevents the resin particles from dissolving in the organic solvent(s) easily.

The organic solvent is preferably a water-soluble one. Being water-soluble refers to an organic solvent that does not apparently separate or become turbid after being mixed and stirred with water at room temperature in a 1:1 mass ratio.

Examples of glycol ethers include, but are not limited to, glycol diethers and glycol monoethers.

Specific examples of glycol diethers include, but are not limited to, ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

Examples include ethylene glycol monomethyl ether, ethylene glycol monoethyl ether, ethylene glycol mono-n-propyl ether, ethylene glycol monoisopropyl ether, ethylene glycol monobutylether, ethylene glycol monohexylether, ethylene glycol monophenylether, diethylene glycol monomethyl ether, diethylene glycol monoethyl ether, diethylene glycol monobutylether triethylene glycol monomethyl ether, triethylene glycol monoethyl ether, triethylene glycol monobutylether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

For the organic solvent, it is also preferred to use one(s) that has an SP of 25.0 to 35.0. The SP is more preferably from 26.0 to 34.0, even more preferably from 26.0 to 32.5. When the SP is in any of these ranges, the ink composition tends to be superior in storage stability because the suitable degree of hydrophilicity of the ink composition prevents the resin particles from dissolving in the organic solvent(s) easily.

Here, the "SP" is a value called Solubility Parameter. It represents a value calculated using the Hansen equation, which is given below. The Hansen solubility parameters are a three-dimensional representation of the solubility parameter introduced by Hildebrand using the three components of the dispersion term δd, polarity term δp, and hydrogen-bond term δh. The SPs herein are expressed as $\delta\ [(cal/cm^3)^{0.5}]$ and are values calculated using the mathematical expression below.

$$\delta[(cal/cm^3)^{0.5}] = (\delta d^2 + \delta p^2 + \delta h^2)^{0.5}$$

δd is preferably from 13.0 to 20.0, more preferably from 14.0 to 17.2. δp is preferably from 10.0 to 17.0, more preferably from 10.5 to 15.0. δh is preferably from 17.0 to 26.0, more preferably from 20.0 to 25.0. When such is the case, the ink composition tends to be superior in storage stability because the suitable degree of hydrophilicity of the ink composition prevents the resin particles from dissolving in the organic solvent(s) easily.

Examples of organic solvents with which the SP and δd, δp, and δh will have such preferred values include 1,3-propanediol, 1,4-butanediol, and 1,5-pentanediol.

The organic solvent content is preferably from 0.01% to 50% by mass, more preferably from 0.1% to 10% by mass, even more preferably from 1% to 5% by mass of the total amount (100% by mass) of the ink composition. The use of organic solvent(s) in an amount in any of these ranges tends to further improve the drying of the ink composition after it adheres to a recording medium and, furthermore, tends to help obtain a printing better in fastness to rubbing.

<Lubricant>

Preferably, the ink composition in this embodiment further contains at least one lubricant. The presence of lubricant(s) tends to help obtain a printing better in fastness to rubbing as a result of the lubricating material(s) penetrating between fibers of the fabric included in the recording medium (reducing a feeling of roughness).

Examples of lubricants include, but are not limited to, calcium stearate, ammonium stearate, microcrystalline waxes, polyethylene waxes, paraffin waxes, and polyethylene-paraffin waxes. Examples of commercially available lubricants include AQUACER 497 (BYK) and Michem Emulsion 85250 (trade name of a Michelman product). Of these, polyethylene compounds, i.e., polyethylene and polyethylene-paraffin waxes and Michem Emulsion 85250 (trade name of a Michelman product), are more preferred than the others. One of these lubricants may be used alone, or two or more may be used in combination.

The lubricant content of the ink composition is preferably 0.1% by mass or more and 10% by mass or less, more preferably 0.3% by mass or more and 5.0% by mass or less, even more preferably 0.5% by mass or more and 2.0% by mass or less of the total amount (100% by mass) of the ink composition. The use of lubricant(s) in an amount in any of these ranges tends to help obtain a printing better in fastness to rubbing.

<Surfactant>

Preferably, the ink composition further contains at least one surfactant for glossiness. Examples of surfactants include, but are not limited to, acetylene glycol surfactants, fluorosurfactants, and silicone surfactants.

Acetylene glycol surfactant(s) is preferably, but not necessarily, one or more selected from 2,4,7,9-tetramethyl-5-decyne-4,7-diol and alkylene oxide adducts of 2,4,7,9-tetramethyl-5-decyne-4,7-diol and 2,4-dimethyl-5-decyne-4-ol and alkylene oxide adducts of 2,4-dimethyl-5-decyne-4-ol. Examples of commercially available acetylene glycol surfactants include, but are not limited to, OLFINE® 104 surfactants and OLFINE E1010 and other E surfactants (trade names of products of Air Products Japan, Inc.) and Surfynol® 104, 465, 61, and DF110D (trade names of products of Nissin Chemical Industry CO., Ltd.). One acetylene glycol surfactant may be used alone, or two or more may be used in combination.

Examples of fluorosurfactants include, but are not limited to, perfluoroalkyl sulfonates, perfluoroalkyl carboxylates, perfluoroalkyl phosphates, perfluoroalkyl ethylene oxide adducts, perfluoroalkyl betaines, and perfluoroalkyl amine oxide compounds. Examples of commercially available fluorosurfactants include, but are not limited to, S-144 and S-145 (trade names, Asahi Glass Co., Ltd.; FC-170C, FC-430, and FLUORAD-FC4430 (trade names, Sumitomo 3M Ltd.); FSO, FSO-100, FSN, FSN-100, and FS-300 (trade names, Dupont); and FT-250 and 251 (trade names, NEOS Co., Ltd.). One fluorosurfactant may be used alone, or two or more may be used in combination.

Examples of silicone surfactants include, but are not limited to, polysiloxane compounds and polyether-modified organosiloxanes. Examples of commercially available silicone surfactants include, but are not limited to, SAG503A (trade name, Nissin Chemical Industry CO., Ltd.), BYK-306, BYK-307, BYK-333, BYK-341, BYK-345, BYK-346, BYK-347, BYK-348, and BYK-349 (trade names, BYK-Chemie), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, Shin-Etsu Chemical). One silicone surfactant may be used alone, or two or more may be used in combination.

The surfactant content is preferably from 0.05% to 2.5% by mass, more preferably from 0.05% to 1.5% by mass of the total amount (100% by mass) of the ink composition. The use of surfactant(s) in an amount in any of these ranges tends to further improve the wettability of the ink composition after it adheres to a recording medium.

The ink compositions can optionally contain additives, such as softening agents, waxes, dissolution aids, viscosity modifiers, pH-adjusting agents, such as triethanolamine, humectants, such as glycerol, antioxidants, antimolds/preservatives, such as PROXEL XL2 (trade name of an Arch Chemicals product), fungicides, anticorrosives, and chelating agents for capturing metal ions that would affect dispersion (e.g., sodium ethylenediaminetetraacetate), as extra ingredients. Of these, those substances that are also organic solvents, such as glycerol, are also included in the organic solvent(s) described above.

[Coating Composition]

The coating composition in this embodiment contains resin particles and water, can contain the ingredients that can be contained in the ink composition, described above, in the same way as the ink composition, and, in addition to these, can optionally contain other ingredients as necessary. The coating composition, however, is substantially free of pigments to provide superior fastness to rubbing. "Substantially free" means that the coating composition contains no pigment or the pigment content is less than 0.1 by mass of the total amount (100% by mass) of the coating composition. Here, the resin particles contained in the coating composition are also referred to as the second resin particles.

The Young's modulus of dried film of the coating composition is 50 MPa or less and higher than that of dried film of the ink composition. By virtue of the Young's modulus of dried film of the coating composition being such a Young's modulus, the resulting printing is superior in feel and texture and fastness to rubbing.

The Young's modulus of dried film of the coating composition is preferably from 5 to 50 MPa, more preferably from 10 to 40 MPa, even more preferably from 20 to 30 MPa. A Young's modulus of the film in any of these ranges tends to help obtain a printing better in feel and texture and fastness to rubbing. The Young's modulus of the film can be adjusted to be in these ranges by customizing the ingredients of the coating composition and their amounts, in particular the resin particles and their amount, as necessary. The Young's modulus of the film is measured according to the method described in Examples.

The Young's modulus of dried film of the coating composition is higher than that of dried film of the ink composition preferably by 1 to 50 MPa, more preferably by 3 to 35 MPa, even more preferably by 5 to 25 MPa. A Young's modulus of dried film of the coating composition in any of these ranges tends to help obtain a printing better in feel and texture and fastness to rubbing.

As mentioned herein, dried film of a coating composition represents a film obtained by drying the coating composition. A specific example of a film is obtained as follows: On a flat substrate, such as of metal or glass, a mold having an opening measuring 3×19 cm is made to a height sufficient to serve as a rectangular well. Ten grams of the ink composition is cast into the mold. After overnight drying in the atmosphere, the coating composition is heated at 160° C. and 15 minutes, and then the coating film is collected by removing it from the substrate. More specifically, the film can be prepared by the method described in Examples below.

Preferably, the coating composition is a composition for being applied to a recording medium by dipping as described in [Attachment Step] below. This ensures the coating composition will be applied not only to the front, to which the ink composition will have adhered, but also to the other side, or the back, of the fabric that is the recording medium. By virtue of improved sliding between fibers, the resulting printing tends to be better in feel and texture.

The second resin particles may be selected from the same kinds of resin particles as described above, but of the kinds of resin particles described above, it is particularly preferred that the second resin particles contain a silicone resin to ensure a suitable Young's modulus of film. It is preferred that the second resin particles contain a urethane resin, more preferably a urethane resin that has a polycarbonate backbone, to give a printing better in feel and texture and fastness to rubbing. It is also more preferred that the second resin particles contain a urethane resin that has a crosslinking group to give a printing even better in fastness to rubbing.

The amount of the second resin particles is preferably from 0.1% to 13% by mass, more preferably from 0.1% to 10% by mass, more preferably from 0.5% to 7% by mass, still more preferably from 1.0% to 3% by mass, on a solids basis, of the total amount (100% by mass) of the ink composition. The presence of the second resin particles in an amount of 10% by mass or less tends to make the finished printing better in feel and texture and fastness to rubbing, and the presence of the second resin particles in an amount of 0.1% by mass or more tends to make the finished printing better in fastness to rubbing Preferably, the coating composition in this embodiment further contains lubricant(s). The presence of lubricant(s) tends to help obtain a printing better in fastness to rubbing as a result of improved sliding smoothness of the surface of the recording medium.

The lubricant content of the coating composition is preferably 0.1% by mass or more and 10% by mass or less, more preferably 0.3% by mass or more and 5.0% by mass or less, even more preferably 0.5% by mass or more and 2.0% by mass or less of the total amount (100% by mass) of the ink composition. The use of lubricant(s) in an amount in any of these ranges tends to help obtain a printing better in fastness to rubbing.

The set of compositions according to this embodiment is used in the method for ink jet textile printing described below.

[Method for Ink Jet Textile Printing]

A method according to an embodiment for ink jet textile printing has a step of attaching the ink and coating compositions included in a set of compositions according to an embodiment to a recording medium including a fabric (attachment step). FIG. 1 is a flowchart illustrating an example of a textile printing method according to this embodiment. As illustrated in FIG. 1, the textile printing method according to this embodiment may, besides the aforementioned attachment step, have the heating and washing steps described below.

This method for ink jet textile printing is a textile printing method in which an ink composition is loaded into an ink jet apparatus before use. The ink jet apparatus can be of any kind, but an example can be a drop-on-demand ink jet device. Examples of ink jet devices of this drop-on-demand type include devices that employ ink jet textile printing using piezoelectric elements installed in the head and devices that employ ink jet textile printing using thermal energy, for example from the heater of heater resistor elements installed in the head, and the ink jet apparatus can be a device of any type of ink jet textile printing. In the following, each step of the method for ink jet textile printing is described in detail.

[Attachment Step]

In the attachment step in this embodiment, the ink composition is attached to a recording medium, for example by ink jet ejection of the ink composition to a surface of the fabric that is the recording medium (region for image formation), to form an image. The conditions for ejection can be determined as necessary based on the physical characteristics of the ink composition to be ejected. In the attachment in this embodiment, moreover, the coating composition is applied to the recording medium, for example by dipping. Specifically, the coating composition is attached by immersing, in the coating composition, the surface of the fabric as the recording medium to which the ink composition has adhered. Here, when the coating composition is attached to the recording medium, it may be attached by ink jet ejection like the ink composition. When the coating composition is attached by ink jet ejection, it is preferred to attach it after attaching the ink composition.

[Heating Step]

The textile printing method in this embodiment may further have, after the attachment step, a heating step in which the recording medium with the adhering ink and coating compositions thereon is heated. The use of a heating step helps fix the dye better onto the fibers forming the fabric. Examples of methods for heating include, but are not limited to, the HT process (high-temperature steaming), the HP process (high-pressure steaming), and the thermosol process.

The heating step may be with pressurizing the surface of the recording medium to which the ink and coating compositions have been attached or may be without such pressurization. An example of a heating method without pressurization of the surface of the recording medium to which the ink and coating compositions have been attached is oven drying (method involving no pressing, such as a conveyor oven or batch oven). The use of such a heating step further improves the productivity in manufacturing recordings. Examples of heating methods that involve pressurizing the surface of the recording medium to which the ink and coating compositions have been attached include, but are not limited to, heat pressing and the wet-on-dry technique. "Pressurize" means applying pressure to the recording medium by bringing an individual into contact with it.

The temperature for heating is preferably 130° C. or more and 180° C. or less, more preferably 140° C. or more and 175° C. or less, even more preferably 150° C. or more and 170° C. or less. Heating at a temperature in any of these ranges tends to help fix the dye better onto the fibers forming the fabric.

[Cleaning Step]

The textile printing method in this embodiment may further have, after the heating step, a washing step in which the recording medium with the adhering ink and coating compositions thereon is washed. The washing step helps effectively remove pigment not fixed on fibers. The washing step can be performed using, for example, water and may optionally involve soaping. One but not the only example of a method for soaping is, i.e., to wash away unfixed pigment, for example with heated detergent.

This gives a recording, such as a printing, as a combination of a recording medium including a fabric and an image derived from an ink composition as described above formed thereon.

<Recording Medium>

The recording medium in this embodiment only needs to be one that includes a fabric (Or it can be a fabric itself). The fabric can be, for example, silk, cotton, wool, nylon, polyester, rayon, or any other natural or synthetic fiber, although examples are not limited to these. The fabric may be a single-fiber one or may be a blend of two or more fibers. In particular, the use of a blend of fibers varying in permeability tends to make it easier to benefit from this embodiment. The fabric may be in any form, such as woven, knitted, or nonwoven fabric, of one or more of the listed fibers.

EXAMPLES

The following describes the present invention in further detail by providing examples. The present invention is by no means limited to these examples.

[Materials for Ink Compositions and Coating Compositions]

Major materials for ink compositions and coating compositions used in the production of recordings described below are as follows.

[Liquid Dispersion of Pigment]

C.I. Pigment Blue 15:3 (Dainichiseika Color & Chemicals Mfg.; "PB-15:3" in tables.)

[Resin Particles]

UW-1501F (ETERNACOLL UW-1501F, Ube Industries; a urethane resin, containing a polycarbonate backbone)

WS-5984 (TAKELAC WS-5984, Mitsui Chemicals; a urethane resin, containing a polyester backbone)

WS-5000 (TAKELAC WS-5000, a trade name of a Mitsui Chemicals product; a urethane resin, containing a polyester backbone)

WS-5100 (TAKELAC WS-5100, a trade name of a Mitsui Chemicals product; a urethane resin, containing a polycarbonate backbone)

UA-150 (PERMARIN UA-150, a trade name of a Sanyo Chemical Industries product; a urethane resin, containing a polyether backbone)

UA-200 (PERMARIN UA-200, a trade name of a Sanyo Chemical Industries product; a urethane resin, containing a polyether backbone)

UX-390 (UCOAT UX-390, a trade name of a Sanyo Chemical Industries product; a urethane resin)

WLS-210 (HYDRAN WLS-210, a trade name of a DIC product; a urethane resin, containing a polycarbonate backbone)

6760 (Mowinyl 6760, a trade name of a Nippon Synthetic Chemical Industry product; an acrylic resin)

POLON-MF014 (Shin-Etsu Silicone, a silicone resin)

POLON-MF-18T (Shin-Etsu Silicone, a silicone resin)

POLON-MF-33 (Shin-Etsu Silicone, a silicone resin)

KM-2002-T (Shin-Etsu Silicone, a silicone resin)

WACKER FINISH WR1100 (trade name of an Asahi Kasei product; a silicone resin)

NP2406 (Asahi Kasei, a silicone resin)

POWERSOFT FE 55 (Asahi Kasei, a silicon resin)

TS2406 (Asahi Kasei, a silicone resin)

[Organic Solvents]
  1,3-Propanediol
  1,4-Butanediol
  1,5-Pentanediol
  Propylene glycol
  Ethylene glycol
[Lubricating Material]
  AQUACER 497 (BYK, a paraffin wax)
[Extra Ingredients]
  Glycerol
  SAG503A (trade name of a product of Nissin Chemical Industry CO., Ltd.; a surfactant)
  TEA (triethanolamine, a pH-adjusting agent)
  PROXEL XL2 (trade name of an Arch Chemicals product; a preservative)
  Purified water
  Dipropylene glycol monomethyl ether
  3-Butoxy-N,N-dimethylpropionamide
  3-Methoxy-N,N-dimethylpropionamide
  N-Methylpyrrolidone
  Triethylene glycol monobutyl ether
[Surfactants]
  BYK348 (trade name, BYK-Chemie)
  MF410 (trade name, DIC; a perfluoroalkyl-containing carboxylate surfactant)
  DW800 (trade name, BYK-Chemie; a polyoxyethylene-alkyl-ether-containing surfactant)
[Water]
  Purified water (ion exchange water)
[Preparation of Ink Compositions]

Ink compositions were prepared by mixing materials according to the formulae given in Tables 1, 3, and 5 below. Specifically, purified water was mixed with an organic solvent, a humectant, a pH-adjusting agent, a surfactant, and a preservative, then the mixture was stirred for 15 minutes, then resin particles were gradually added dropwise with stirring, and then the mixture was stirred for 1 hour to give a liquid dispersion of resin. Then the prepared liquid dispersion of resin was gradually added dropwise to a liquid dispersion of pigment, and then the mixture was stirred for 1 hour and filtered through an MF-Membrane Filter (SCWP: mixed cellulose esters, 8 μm), giving an ink composition.

[Preparation of Coating Compositions]

Coating compositions were obtained by mixing materials according to the formulae given in Tables 2, 4, and 5 and then stirring the mixture thoroughly.

[Production of Film Samples]

A mold of silicone rubber (thickness: 5 mm) was made on a flat stainless steel (SUS) sheet. Ten grams of the ink composition or coating composition prepared was cast into an opening of 3 cm×19 cm. After overnight drying in the atmosphere, the composition was heated at 160° C. for 15 minutes, giving film on the SUS. Then the film was collected by removing it from the SUS.

[Young's Modulus]

For the resulting films, the stress-strain curve was measured using TENSILON universal testing instrument (trade name of an A&D product: RTG-1250) under the conditions of a specimen size of 10 mm wide and 30 mm tall and a tensile speed of 100 mm/min. The Young's modulus [MPa] was determined by linear regression of the stress-strain curve within the strain range of 0.05% to 0.25%. The thickness of film required for this measurement was determined by actually measuring it using a micrometer (Mitutoyo's product, trade name "MDH-25M"). The Young's modulus of dried films of the ink and coating compositions is summarized in Tables 1 to 5.

TABLE 1

| | Ink composition | | | | | | | |
|---|---|---|---|---|---|---|---|---|
| | Liquid dispersion of pigment | | | Resin particles | | | | |
| | Material (manufacturer) | Average particle diameter (μm) | Solids content (% by mass) | Trade name (manufacturer) | Material | Cross-linking group | Average particle diameter (μm) | Solids content (% by mass) |
| Example 1 | PB-15:3 (Dainichiseika) | 90 | 3.7 | UW-1501F (Ube Industries) | Urethane resin | Blocked isocyanate | 53 | 10 |
| Example 2 | PB-15:3 (Dainichiseika) | 90 | 3.7 | WS-5984 (Mitsui Chemicals) | Urethane resin | Silanol | 50 | 10 |
| Example 3 | PB-15:3 (Dainichiseika) | 90 | 3.7 | WS-5000 (Mitsui Chemicals) | Urethane resin | Silanol | 59 | 10 |
| Example 4 | PB-15:3 (Dainichiseika) | 90 | 3.7 | UA-150 (Sanyo Chemical Industries) | Urethane resin | — | 72 | 10 |
| Example 5 | PB-15:3 (Dainichiseika) | 90 | 3.7 | UA-200 (Sanyo Chemical Industries) | Urethane resin | — | 52 | 10 |
| Example 6 | PB-15:3 (Dainichiseika) | 90 | 3.7 | WLS-210 (DIC) | Urethane resin | — | 55 | 10 |
| Example 7 | PB-15:3 (Dainichiseika) | 90 | 3.7 | WS-5984 (Mitsui Chemicals) | Urethane resin | Silanol | 50 | 10 |
| Example 8 | PB-15:3 (Dainichiseika) | 90 | 3.7 | WS-5984 (Mitsui Chemicals) | Urethane resin | Silanol | 50 | 10 |
| Example 9 | PB-15:3 (Dainichiseika) | 90 | 3.7 | WS-5984 (Mitsui Chemicals) | Urethane resin | Silanol | 50 | 10 |

TABLE 1-continued

| | | | | | | | | | |
|---|---|---|---|---|---|---|---|---|---|
| Example 10 | PB-15:3 (Dainichiseika) | 90 | 3.7 | WS-5984 (Mitsui Chemicals) | Urethane resin | Silanol | 50 | 10 |
| Example 11 | PB-15:3 (Dainichiseika) | 90 | 3.7 | WS-5984 (Mitsui Chemicals) | Urethane resin | Silanol | 50 | 10 |
| Example 12 | PB-15:3 (Dainichiseika) | 90 | 3.7 | WS-5984 (Mitsui Chemicals) | Urethane resin | Silanol | 50 | 10 |
| Example 13 | PB-15:3 (Dainichiseika) | 90 | 3.7 | WS-5984 (Mitsui Chemicals) | Urethane resin | Silanol | 50 | 10 |
| Example 14 | PB-15:3 (Dainichiseika) | 90 | 3.7 | WS-5984 (Mitsui Chemicals) | Urethane resin | Silanol | 50 | 10 |
| Example 15 | PB-15:3 (Dainichiseika) | 90 | 3.7 | WS-5984 (Mitsui Chemicals) | Urethane resin | Silanol | 50 | 10 |

| | Ink composition | | | Film characteristics |
|---|---|---|---|---|
| | Organic solvent | | Extra ingredients | |
| | | | Humectant/Surfactant/ pH-adjusting agent/ Preservative/ Purified water | (Solids) Content (% by mass) |
| | Material | Content (wt %) | | | Young's modulus |
| Example 1 | 1,3-Propanediol (Tokyo Chemical Industry) | 3 | Glycerol/SAG503A/ TEA/PROXEL XL2/Purified water | 12/0.5/1/0.3/ Balance | 24 |
| Example 2 | 1,3-Propanediol (Tokyo Chemical Industry) | 3 | Glycerol/SAG503A/ TEA/PROXEL XL2/Purified water | 12/0.5/1/0.3/ Balance | 5 |
| Example 3 | 1,3-Propanediol (Tokyo Chemical Industry) | 3 | Glycerol/SAG503A/ TEA/PROXEL XL2/Purified water | 12/0.5/1/0.3/ Balance | 5 |
| Example 4 | 1,3-Propanediol (Tokyo Chemical Industry) | 3 | Glycerol/SAG503A/ TEA/PROXEL XL2/Purified water | 12/0.5/1/0.3/ Balance | 1 |
| Example 5 | 1,3-Propanediol (Tokyo Chemical Industry) | 3 | Glycerol/SAG503A/ TEA/PROXEL XL2/Purified water | 12/0.5/1/0.3/ Balance | 2 |
| Example 6 | 1,3-Propanediol (Tokyo Chemical Industry) | 3 | Glycerol/SAG503A/ TEA/PROXEL XL2/Purified water | 12/0.5/1/0.3/ Balance | 10 |
| Example 7 | 1,3-Propanediol (Tokyo Chemical Industry) | 3 | Glycerol/SAG503A/ TEA/PROXEL XL2/Purified water | 12/0.5/1/0.3/ Balance | 5 |
| Example 8 | 1,3-Propanediol (Tokyo Chemical Industry) | 3 | Glycerol/SAG503A/ TEA/PROXEL XL2/Purified water | 12/0.5/1/0.3/ Balance | 5 |
| Example 9 | 1,3-Propanediol (Tokyo Chemical Industry) | 3 | Glycerol/SAG503A/ TEA/PROXEL XL2/Purified water | 12/0.5/1/0.3/ Balance | 5 |
| Example 10 | 1,3-Propanediol (Tokyo Chemical Industry) | 3 | Glycerol/SAG503A/ TEA/PROXEL XL2/Purified water | 12/0.5/1/0.3/ Balance | 5 |
| Example 11 | 1,3-Propanediol (Tokyo Chemical Industry) | 3 | Glycerol/SAG503A/ TEA/PROXEL XL2/Purified water | 12/0.5/1/0.3/ Balance | 5 |
| Example 12 | 1,4-Butanediol (Tokyo Chemical Industry) | 3 | Glycerol/SAG503A/ TEA/PROXEL XL2/Purified water | 12/0.5/1/0.3/ Balance | 5 |
| Example 13 | 1,5-Pentanediol (Tokyo Chemical Industry) | 3 | Glycerol/SAG503A/ TEA/PROXEL XL2/Purified water | 12/0.5/1/0.3/ Balance | 5 |
| Example 14 | Propylene glycol (Tokyo Chemical Industry) | 3 | Glycerol/SAG503A/ TEA/PROXEL XL2/Purified water | 12/0.5/1/0.3/ Balance | 5 |
| Example 15 | Ethylene glycol | 3 | Glycerol/SAG503A/ TEA/PROXEL XL2/Purified water | 12/0.5/1/0.3/ Balance | 5 |

TABLE 2

| | Coating composition | | | | | | | Film characteristics | Difference in Young's modulus (coating composition − ink composition) |
|---|---|---|---|---|---|---|---|---|---|
| | Resin particles | | | Lubricant | | Extra ingredients | | | |
| | Trade name | Material | Solids content (% by mass) | Trade name | Solids content (% by mass) | Purified water | Content (wt %) | Young's modulus | |
| Example 1 | POLON-MF014 (Shin-Etsu Silicone) | Silicone resin | 1 | AQUACER497 (BYK) | 1 | Purified water | Balance | 30 | 6 |
| Example 2 | POLON-MF014 (Shin-Etsu Silicone) | Silicone resin | 1 | AQUACER497 (BYK) | 1 | Purified water | Balance | 30 | 25 |
| Example 3 | POLON-MF014 (Shin-Etsu Silicone) | Silicone resin | 1 | AQUACER497 (BYK) | 1 | Purified water | Balance | 30 | 25 |
| Example 4 | POLON-MF014 (Shin-Etsu Silicone) | Silicone resin | 1 | AQUACER497 (BYK) | 1 | Purified water | Balance | 30 | 29 |
| Example 5 | POLON-MF014 (Shin-Etsu Silicone) | Silicone resin | 1 | AQUACER497 (BYK) | 1 | Purified water | Balance | 30 | 28 |
| Example 6 | POLON-MF014 (Shin-Etsu Silicone) | Silicone resin | 1 | AQUACER497 (BYK) | 1 | Purified water | Balance | 30 | 20 |
| Example 7 | WACKER FINISH WR 1100 (Asahi Kasei) | Silicone resin | 1 | AQUACER497 (BYK) | 1 | Purified water | Balance | 20 | 15 |
| Example 8 | NP 2406 (Asahi Kasei) | Silicone resin | 3 | AQUACER497 (BYK) | 1 | Purified water | Balance | 15 | 10 |
| Example 9 | POLON-MF-18T (Shin-Etsu Silicone) | Silicone resin | 1.5 | AQUACER497 (BYK) | 1 | Purified water | Balance | 19 | 14 |
| Example 10 | POLON-MF-33 (Shin-Etsu Silicone) | Silicone resin | 2 | AQUACER497 (BYK) | 1 | Purified water | Balance | 10 | 5 |
| Example 11 | POWERSOFT FE 55 (Asahi Kasei) | Silicone resin | 2.5 | AQUACER497 (BYK) | 1 | Purified water | Balance | 22 | 17 |
| Example 12 | POLON-MF014 (Shin-Etsu Silicone) | Silicone resin | 1 | AQUACER497 (BYK) | 1 | Purified water | Balance | 30 | 25 |
| Example 13 | POLON-MF014 (Shin-Etsu Silicone) | Silicone resin | 1 | AQUACER497 (BYK) | 1 | Purified water | Balance | 30 | 25 |
| Example 14 | POLON-MF014 (Shin-Etsu Silicone) | Silicone resin | 1 | AQUACER497 (BYK) | 1 | Purified water | Balance | 30 | 25 |
| Example 15 | POLON-MF014 (Shin-Etsu Silicone) | Silicone resin | 1 | AQUACER497 (BYK) | 1 | Purified water | Balance | 30 | 25 |

TABLE 3

| | Ink composition | | | | | | | |
|---|---|---|---|---|---|---|---|---|
| | Liquid dispersion of pigment | | | Resin particles | | | | |
| | Material (manufacturer) | Average particle diameter (μm) | Solids content (% by mass) | Trade name (manufacturer) | Material | Cross-linking group | Average particle diameter (μm) | Solids content (% by mass) |
| Example 16 | PB-15:3 (Dainichiseika) | 90 | 3.7 | WS-5984 (Mitsui Chemicals) | Urethane resin | Silanol | 50 | 3.7 |
| Example 17 | PB-15:3 (Dainichiseika) | 90 | 3.7 | WS-5984 (Mitsui Chemicals) | Urethane resin | Silanol | 50 | 18.5 |
| Example 18 | PB-15:3 (Dainichiseika) | 90 | 3.7 | UW-1501F (Ube Industries) | Urethane resin | Blocked isocyanate | 53 | 3.7 |
| Example 19 | PB-15:3 (Dainichiseika) | 90 | 3.7 | UW-1501F (Ube Industries) | Urethane resin | Blocked isocyanate | 53 | 18.5 |
| Example 20 | PB-15:3 (Dainichiseika) | 90 | 3.7 | WS-5984 (Mitsui Chemicals) | Urethane resin | Silanol | 50 | 10 |
| Example 21 | PB-15:3 (Dainichiseika) | 90 | 3.7 | WS-5984 (Mitsui Chemicals) | Urethane resin | Silanol | 50 | 10 |
| Comparative Example 1 | PB-15:3 (Dainichiseika) | 90 | 3.7 | 6760 (Nippon Synthetic Chemical Industry) | Acrylic | — | 59 | 10 |

TABLE 3-continued

| | | | | | | | | | |
|---|---|---|---|---|---|---|---|---|---|
| Comparative Example 2 | PB-15:3 (Dainichiseika) | 90 | 3.7 | UX390 (Sanyo Chemical Industries) | Urethane resin | — | | 60 | 10 |
| Comparative Example 3 | PB-15:3 (Dainichiseika) | 90 | 3.7 | UW-1501F (Ube Industries) | Urethane resin | Blocked isocyanate | | 53 | 10 |
| Comparative Example 4 | PB-15:3 (Dainichiseika) | 90 | 3.7 | UW-1501F (Ube Industries) | Urethane resin | Blocked isocyanate | | 53 | 10 |
| Comparative Example 5 | PB-15:3 (Dainichiseika) | 90 | 3.7 | WS-5984 (Mitsui Chemicals) | Urethane resin | Silanol | | 50 | 20 |
| Comparative Example 6 | PB-15:3 (Dainichiseika) | 90 | 3.7 | WS-5984 (Mitsui Chemicals) | Urethane resin | Silanol | | 50 | 1 |
| Comparative Example 7 | PB-15:3 (Dainichiseika) | 90 | 3.7 | UW-1501F (Ube Industries) | Urethane resin | Blocked isocyanate | | 53 | 10 |
| Comparative Example 8 | PB-15:3 (Dainichiseika) | 90 | 3.7 | WS-5984 (Mitsui Chemicals) | Urethane resin | Silanol | | 50 | 10 |

| | Ink composition | | | | Film characteristics |
|---|---|---|---|---|---|
| | Organic solvent | | Extra ingredients | | |
| | Material | Content (wt %) | Humectant/Surfactant/pH-adjusting agent/Preservative/Purified water | (Solids) Content (% by mass) | Young's modulus |
| Example 16 | 1,3-Propanediol (Tokyo Chemical Industry) | 3 | Glycerol/SAG503A/TEA/PROXEL XL2/Purified water | 12/0.5/1/0.3/Balance | 5 |
| Example 17 | 1,3-Propanediol (Tokyo Chemical Industry) | 3 | Glycerol/SAG503A/TEA/PROXEL XL2/Purified water | 12/0.5/1/0.3/Balance | 5 |
| Example 18 | 1,3-Propanediol (Tokyo Chemical Industry) | 3 | Glycerol/SAG503A/TEA/PROXEL XL2/Purified water | 12/0.5/1/0.3/Balance | 24 |
| Example 19 | 1,3-Propanediol (Tokyo Chemical Industry) | 3 | Glycerol/SAG503A/TEA/PROXEL XL2/Purified water | 12/0.5/1/0.3/Balance | 24 |
| Example 20 | 1,3-Propanediol (Tokyo Chemical Industry) | 3 | Glycerol/SAG503A/TEA/PROXEL XL2/Purified water | 12/0.5/1/0.3/Balance | 5 |
| Example 21 | 1,3-Propanediol (Tokyo Chemical Industry) | 3 | Glycerol/SAG503A/TEA/PROXEL XL2/Purified water | 12/0.5/1/0.3/Balance | 5 |
| Comparative Example 1 | 1,3-Propanediol (Tokyo Chemical Industry) | 3 | Glycerol/SAG503A/TEA/PROXEL XL2/Purified water | 12/0.5/1/0.3/Balance | 0.5 |
| Comparative Example 2 | 1,3-Propanediol (Tokyo Chemical Industry) | 3 | Glycerol/SAG503A/TEA/PROXEL XL2/Purified water | 12/0.5/1/0.3/Balance | 30 |
| Comparative Example 3 | 1,3-Propanediol (Tokyo Chemical Industry) | 3 | Glycerol/SAG503A/TEA/PROXEL XL2/Purified water | 12/0.5/1/0.3/Balance | 24 |
| Comparative Example 4 | 1,3-Propanediol (Tokyo Chemical Industry) | 3 | Glycerol/SAG503A/TEA/PROXEL XL2/Purified water | 12/0.5/1/0.3/Balance | 24 |
| Comparative Example 5 | 1,3-Propanediol (Tokyo Chemical Industry) | 3 | Glycerol/SAG503A/TEA/PROXEL XL2/Purified water | 12/0.5/1/0.3/Balance | 5 |
| Comparative Example 6 | 1,3-Propanediol (Tokyo Chemical Industry) | 3 | Glycerol/SAG503A/TEA/PROXEL XL2/Purified water | 12/0.5/1/0.3/Balance | 5 |
| Comparative Example 7 | 1,3-Propanediol (Tokyo Chemical Industry) | 3 | Glycerol/SAG503A/TEA/PROXEL XL2/Purified water | 12/0.5/1/0.3/Balance | 24 |
| Comparative Example 8 | 1,3-Propanediol (Tokyo Chemical Industry) | 3 | Glycerol/SAG503A/TEA/PROXEL XL2/Purified water | 12/0.5/1/0.3/Balance | 5 |

TABLE 4

| | Coating composition | | | | | | | Film characteristics | Difference in Young's modulus (coating composition − ink composition) |
|---|---|---|---|---|---|---|---|---|---|
| | Resin particles | | | Lubricant | | Extra ingredients | | | |
| | Trade name | Material | Solids content (% by mass) | Trade name | Solids content (% by mass) | Purified water | Content (wt %) | Young's modulus | |
| Example 16 | POLON-MF014 (Shin-Etsu Silicone) | Silicone resin | 1 | AQUACER497 (BYK) | 1 | Purified water | Balance | 30 | 6 |
| Example 17 | POLON-MF014 (Shin-Etsu Silicone) | Silicone resin | 1 | AQUACER497 (BYK) | 1 | Purified water | Balance | 30 | 25 |
| Example 18 | POLON-MF014 (Shin-Etsu Silicone) | Silicone resin | 1 | AQUACER497 (BYK) | 1 | Purified water | Balance | 30 | 25 |
| Example 19 | POLON-MF014 (Shin-Etsu Silicone) | Silicone resin | 1 | AQUACER497 (BYK) | 1 | Purified water | Balance | 30 | 29.5 |
| Example 20 | POLON-MF014 (Shin-Etsu Silicone) | Silicone resin | 0.5 | AQUACER497 (BYK) | 1 | Purified water | Balance | 30 | 0 |
| Example 21 | POLON-MF014 (Shin-Etsu Silicone) | Silicone resin | 7 | AQUACER497 (BYK) | 1 | Purified water | Balance | 30 | 6 |
| Comparative Example 1 | POLON-MF014 (Shin-Etsu Silicone) | Silicone resin | 1 | AQUACER497 (BYK) | 1 | Purified water | Balance | 30 | 6 |
| Comparative Example 2 | POLON-MF014 (Shin-Etsu Silicone) | Silicone resin | 1 | AQUACER497 (BYK) | 1 | Purified water | Balance | 30 | 25 |
| Comparative Example 3 | KM-2002-T (Shin-Etsu Silicone) | Silicone resin | 8 | AQUACER497 (BYK) | 1 | Purified water | Balance | 55 | 50 |
| Comparative Example 4 | TS2406 (Asahi Kasei) | Silicone resin | 8 | AQUACER497 (BYK) | 1 | Purified water | Balance | 15 | −9 |
| Comparative Example 5 | POLON-MF014 (Shin-Etsu Silicone) | Silicone resin | 1 | AQUACER497 (BYK) | 1 | Purified water | Balance | 30 | 25 |
| Comparative Example 6 | POLON-MF014 (Shin-Etsu Silicone) | Silicone resin | 1 | AQUACER497 (BYK) | 1 | Purified water | Balance | 30 | 30 |
| Comparative Example 7 | — | — | — | — | — | Purified water | Balance | — | — |
| Comparative Example 8 | — | — | — | — | — | Purified water | Balance | — | — |

TABLE 5

| | Liquid dispersion of pigment | | | | Resin particles | | | | Ink composition | | Organic solvent | | Extra ingredients | | Film characteristics |
|---|---|---|---|---|---|---|---|---|---|---|---|---|---|---|---|
| | Material (manufacturer) | Average particle diameter (μm) | Solids content (% by mass) | Trade name (manufacturer) | Material | Cross-linking group | Average particle diameter (μm) | Solids content (% by mass) | | Material | Content (wt %) | Humectant/Surfactant/pH-adjusting agent/Preservative/Purified water | (Solids) Content (% by mass) | Young's modulus |
| Example 22 | PB-15:3 (Dainichiseika) | 90 | 3.7 | WS-5000 (Mitsui Chemicals) | Urethane resin | Silanol | 59 | 10 | | 1,3-Propanediol (Tokyo Chemical Industry) | 3 | Glycerol/SAG503A/TEA/PROXEL XL2/Purified water | 12/0.5/1/0.3/Balance | 5 |
| Example 23 | PB-15:3 (Dainichiseika) | 90 | 3.7 | WS-5000 (Mitsui Chemicals) | Urethane resin | Silanol | 59 | 10 | | 1,3-Propanediol (Tokyo Chemical Industry) | 3 | Glycerol/SAG503A/TEA/PROXEL XL2/Purified water | 12/0.5/1/0.3/Balance | 5 |
| Example 24 | PB-15:3 (Dainichiseika) | 90 | 3.7 | WS-5100 (Mitsui Chemicals) | Urethane resin | Silanol | 59 | 10 | | 1,3-Propanediol (Tokyo Chemical Industry) | 3 | Glycerol/SAG503A/TEA/PROXEL XL2/Purified water | 12/0.5/1/0.3/Balance | 5 |
| Example 25 | PB-15:3 (Dainichiseika) | 90 | 3.7 | WS-5100 (Mitsui Chemicals) | Urethane resin | Silanol | 59 | 10 | | 1,3-Propanediol (Tokyo Chemical Industry) | 3 | Glycerol/SAG503A/TEA/PROXEL XL2/Purified water | 12/0.5/1/0.3/Balance | 5 |
| Example 26 | PB-15:3 (Dainichiseika) | 90 | 3.7 | WS-6110 (Mitsui Chemicals) | Urethane resin | — | 90 | 10 | | 1,3-Propanediol (Tokyo Chemical Industry) | 3 | Glycerol/SAG503A/TEA/PROXEL XL2/Purified water | 12/0.5/1/0.3/Balance | 5 |
| Example 27 | PB-15:3 (Dainichiseika) | 90 | 3.7 | UW-1501F (Ube Industries) | Urethane resin | Blocked isocyanate | 53 | 10 | | 1,3-Propanediol (Tokyo Chemical Industry) | 3 | Glycerol/SAG503A/TEA/PROXEL XL2/Purified water | 12/0.5/1/0.3/Balance | 24 |
| Example 28 | PB-15:3 (Dainichiseika) | 90 | 3.7 | WS-5984 (Mitsui Chemicals) | Urethane resin | Silanol | 50 | 10 | | 1,3-Propanediol (Tokyo Chemical Industry) | 3 | Glycerol/SAG503A/TEA/PROXEL XL2/Purified water | 12/0.5/1/0.3/Balance | 5 |
| Example 29 | PB-15:3 (Dainichiseika) | 90 | 3.7 | WS-5000 (Mitsui Chemicals) | Urethane resin | Silanol | 59 | 10 | | 1,3-Propanediol (Tokyo Chemical Industry) | 3 | Glycerol/SAG503A/TEA/PROXEL XL2/Purified water | 12/0.5/1/0.3/Balance | 5 |

TABLE 5-continued

| | | Coating composition | | | | | | | | Film characteristics | |
|---|---|---|---|---|---|---|---|---|---|---|---|
| | | Resin particles | | | | Lubricant | | Extra ingredients | | | Difference in Young's modulus |
| | Trade name | Material | Solids content (% by mass) | Crosslinking group | Average particle diameter (μm) | Trade name | Solids content (% by mass) | | Content (wt %) | Young's modulus | (coating composition − ink composition) |
| Example 22 | UW-1501F (Ube Industries) | Urethane resin | 10 | Blocked isocyanate | 53 | AQUACER497 (BYK) | 1 | Purified water | Balance | 24 | 19 |
| Example 23 | UW-1501F (Ube Industries) | Urethane resin | 10 | Blocked isocyanate | 53 | — | — | Purified water | Balance | 24 | 19 |
| Example 24 | UW-1501F (Ube Industries) | Urethane resin | 10 | Blocked isocyanate | 53 | AQUACER497 (BYK) | 1 | Purified water | Balance | 24 | 19 |
| Example 25 | UW-1501F (Ube Industries) | Urethane resin | 10 | Blocked isocyanate | 53 | — | — | Purified water | Balance | 24 | 19 |
| Example 26 | UW-1501F (Ube Industries) | Urethane resin | 10 | Blocked isocyanate | 53 | AQUACER497 (BYK) | 1 | Purified water | Balance | 24 | 19 |
| Example 27 | POLON-MF014 | Silicone resin | 10 | — | — | AQUACER497 (BYK) | 1 | Purified water | Balance | 30 | 6 |
| Example 28 | POLON-MF014 | Silicone resin | 10 | — | — | AQUACER497 (BYK) | 1 | Purified water | Balance | 30 | 25 |
| Example 29 | POLON-MF014 | Silicone resin | 10 | — | — | AQUACER497 (BYK) | 1 | Purified water | Balance | 30 | 25 |

Production of Printings

Examples 1 to 21 and Comparative Examples 1 to 8

The ink composition prepared was attached to a piece of cotton broadcloth (fabric) by ink jet printing using a modified ink jet printer (Seiko Epson, trade name "PX-G930") (The printer had a fabric holder for recording on a fabric). As for recording conditions, a recording was made under the conditions of 23 to 24 ng/dot and 720×720 dpi. In such a way, ink jet textile printing was performed.

After overnight drying in a fume hood, the recording was heated at 160° C. (dry) for 3 minutes using HT-3-550 high-temperature steamer (Tsujii Dyeing Machine Mfg.) to fix the ink composition onto the recording medium, giving a printed fabric. Then this printed fabric was immersed in the coating composition in a 25° C. environment. The coating composition used in combination with the ink composition here was that under the same Example number as the ink composition. Then the fabric was squeezed through a mangle to a pickup of 80% and heated at 150° C. (dry) for 5 minutes using HT-3-550 high-temperature steamer (Tsujii Dyeing Machine Mfg.). In this way, printings of Examples 1 to 21 and Comparative Examples 1 to 8 were produced as a combination of a recording medium and an image formed (printed with ink) thereon.

Production of Printings

Examples 22 to 29

The ink and coating compositions prepared were attached to a piece of cotton broadcloth (fabric) by ink jet printing using the aforementioned modified ink jet printer, the ink and coating compositions ejected from different rows of nozzles. The ink and coating compositions used were those under the same Example number. As for recording conditions, a recording was made under the conditions of 23 to 24 ng/dot and 720×720 dpi. In the printing job, both ink and coating compositions were ejected during each pass of the carriage. The resulting recording had an overlap of dots formed by the ink composition and dots formed by the coating composition. In such a way, ink jet textile printing was performed.

After overnight drying in a fume hood, the recording was heated at 160° C. (dry) for 3 minutes using HT-3-550 high-temperature steamer (Tsujii Dyeing Machine Mfg.) to fix the ink and coating compositions onto the recording medium. In this way, printings of Examples 22 to 29 were produced as a combination of a recording medium and an image formed (printed with ink) thereon.

[Feel and Texture]

Each of the printings obtained in [Production of Printings] above was cut into a size of 20×20 cm, and the tension-curvature curve was measured using KES-FB1-A tensile and shear tester (trade name of a Kato Tech product) under the conditions of a shear tension of 10 gf/cm and a shear angle of ±8°. Shear hardness [gf/(cm·deg)] was determined by linear regression of the measured tension-curvature curve within the curvature range of 0.5° to 2.5°. A piece of cotton broadcloth not coated with an ink or coating composition was also tested for shear hardness in the same way as the printing. The absolute difference between the shear hardness of the printing and that of the cotton broadcloth was calculated, and the printing was graded for feel and texture according to the evaluation criteria given below. Grades of 3 to 5 indicate that the printing had superb touch and benefited from the present invention.

(Evaluation Criteria)

5: The absolute difference in shear hardness is 0.5 or less.
4: The absolute difference in shear hardness is more than 0.5 and 1.0 or less.
3: The absolute difference in shear hardness is more than 1.0 and 1.5 or less.
2: The absolute difference in shear hardness is more than 1.5 and 2.0 or less.
1: The absolute difference in shear hardness is more than 2.0.

[Fastness to Rubbing (Dry)]

Each of the printings obtained in [Production of Printings] above was rubbed using AB-301 Color Fastness Rubbing Tester (trade name of a Tester Sangyo product) under the conditions of a rubbing finger shape of 45R, a load of 200 gf, a reciprocating distance of 20 cm, and a speed of 10 cm/s. After 100 reciprocating strokes were made, the optical density OD was measured using a JIS standard fabric for staining of color fastness test (3-1 in JIS L 0803; canequim #3) and GretagMacbeth SpectroScan (a D65 light source; angle of reflection, 2°), and the printing was graded for fastness to rubbing according to the evaluation criteria given below. Low optical densities OD mean better fastness to rubbing. Grades of 3 to 5 indicate that the printing benefited from the present invention.

(Evaluation Criteria)

6: The optical density OD is 0.10 or less.
5: The optical density OD is more than 0.10 and 0.15 or less.
4: The optical density OD is more than 0.15 and 0.20 or less.
3: The optical density OD is more than 0.20 and 0.25 or less.
2: The optical density OD is more than 0.25 and 0.30 or less.
1: The optical density OD is more than 0.30.

[Fastness to Rubbing (Wet)]

The optical density OD was measured in the same way as in the testing of [Fastness to Rubbing (dry)] above except that the JIS standard fabric for staining of color fastness test was replaced with a JIS standard fabric for staining of color fastness test impregnated with an equal mass of water in the test. The printings were graded for fastness to rubbing according to the evaluation criteria given below. Grades of 3 to 5 indicate that the printing benefited from the present invention.

(Evaluation Criteria)

5: The optical density OD is 0.15 or less.
4: The optical density OD is more than 0.15 and 0.20 or less.
3: The optical density OD is more than 0.20 and 0.25 or less.
2: The optical density OD is more than 0.25 and 0.30 or less.
1: The optical density OD is more than 0.30.

[Ejection Stability]

Each of the ink compositions prepared was loaded into the ink cartridge of an ink jet printer (Seiko Epson, trade name "PX-G930"). The speed of ejection of the ink composition was adjusted using "Dot View" system for monitoring ink jet ejection (trade name of a Tritek product), an observation was made for nonejecting nozzles and curved flight of ink droplets, and the composition was graded for ejection stability according to the evaluation criteria given below.

(Evaluation Criteria)

3: At an ejection speed of 6 m/s, there is no nozzle that fails to eject ink or from which the flight of ink droplets is curved.

2: At an ejection speed of 6 m/s, the number of nozzles that fail to eject ink or from which the flight of ink droplets is curved is more than 0% and 3% or less of the total number of nozzles.

1: At an ejection speed of 6 m/s, the number of nozzles that fail to eject ink or from which the flight of ink droplets is curved is more than 3% of the total number of nozzles.

TABLE 6

|  | Test items | | | |
|---|---|---|---|---|
|  | Feel and texture | Fastness to rubbing (dry) | Fastness to rubbing (wet) | Ejection stability |
| Example 1 | 4 | 6 | 5 | 3 |
| Example 2 | 5 | 5 | 5 | 3 |
| Example 3 | 5 | 5 | 5 | 3 |
| Example 4 | 5 | 5 | 4 | 3 |
| Example 5 | 5 | 5 | 4 | 3 |
| Example 6 | 5 | 5 | 4 | 3 |
| Example 7 | 5 | 5 | 5 | 3 |
| Example 8 | 5 | 4 | 4 | 3 |
| Example 9 | 5 | 5 | 5 | 3 |
| Example 10 | 5 | 4 | 4 | 3 |
| Example 11 | 5 | 5 | 5 | 3 |
| Example 12 | 5 | 5 | 5 | 3 |
| Example 13 | 5 | 5 | 5 | 3 |
| Example 14 | 5 | 5 | 5 | 2 |
| Example 15 | 5 | 5 | 5 | 2 |
| Example 16 | 5 | 3 | 3 | 3 |
| Example 17 | 3 | 5 | 5 | 3 |
| Example 18 | 5 | 5 | 5 | 3 |
| Example 19 | 3 | 6 | 5 | 3 |
| Example 20 | 5 | 5 | 5 | 3 |
| Example 21 | 3 | 5 | 5 | 3 |
| Comparative Example 1 | 5 | 1 | 1 | 3 |
| Comparative Example 2 | 1 | 2 | 2 | 3 |
| Comparative Example 3 | 1 | 2 | 2 | 3 |
| Comparative Example 4 | 1 | 2 | 2 | 3 |
| Comparative Example 5 | 1 | 5 | 5 | 3 |
| Comparative Example 6 | 5 | 1 | 1 | 3 |
| Comparative Example 7 | 4 | 2 | 2 | 3 |
| Comparative Example 8 | 5 | 1 | 1 | 3 |
| Example 22 | 5 | 5 | 5 | 3 |
| Example 23 | 5 | 4 | 5 | 3 |
| Example 24 | 5 | 6 | 5 | 3 |
| Example 25 | 5 | 5 | 5 | 3 |
| Example 26 | 5 | 5 | 4 | 3 |
| Example 27 | 4 | 6 | 5 | 3 |
| Example 28 | 5 | 5 | 5 | 3 |
| Example 29 | 5 | 5 | 5 | 3 |

[Test Results]

The sets of compositions for ink jet textile printing in the Examples were sets of compositions for ink jet textile printing each including an ink composition and a coating composition, the ink composition containing a pigment, first resin particles, and water, and the coating composition containing second resin particles and water, and were made so that: the first resin particles would contain any of a urethane resin, a polycarbonate resin, a (meth)acrylic resin, and a styrene resin; the amount of the first resin particles would be from 1 to 5 parts by mass on a solids basis per part by mass of the pigment (on a solids basis); the Young's modulus of dried film of the ink composition would be from 1 to 25 MPa; and the Young's modulus of dried film of the coating composition would be 50 MPa or less and higher than that of dried film of the ink composition. These sets of compositions were found to be good, as demonstrated by "3" or better grades in feel and texture, fastness to rubbing (dry), and fastness to rubbing (wet).

In Comparative Example 1, the fastness to rubbing (dry) and fastness to rubbing (wet) grades were "1." This is presumably because the Young's modulus for the ink composition was less than 1 MPa; the intermolecular interactions in the film may have been so weak, and therefore the adhesiveness of the film may have been so low, that the interface between the film of the ink composition and the film of the coating composition could be prone to rupture, or the strength of the film itself may have been so low that a rupture inside the film layer could easily occur.

In Comparative Example 2, the fastness to rubbing (dry) and fastness to rubbing (wet) grades were "2." This is presumably because the Young's modulus for the ink composition was equal to that for the coating composition; the intermolecular interactions in the film may have been so strong that the film contracted to an extent that the interface between the film of the ink composition and the film of the coating composition could be prone to stress rupture or that the recording medium (fiber) could be prone to stress rupture.

The invention claimed is:

1. A set of compositions for ink jet textile printing comprising an ink composition and a coating composition, the ink composition containing a pigment, resin particles, and water, and the coating composition containing silicone resin particles and water, wherein:
    the ink composition contains at least one organic solvent, and the at least one organic solvent including any of 1,3-propanediol, 1,4-butanediol, and 1,5-pentanediol;
    the resin particles contained in the ink composition contain any of a urethane resin, a polycarbonate resin, a (meth)acrylic resin, and a styrene resin;
    an amount of the resin particles in the ink composition is from 1 to 5 parts by mass on a solids basis per part by mass of the pigment on a solids basis;
    a Young's modulus of dried film of the ink composition is from 1 to 25 MPa;
    a Young's modulus of dried film of the coating composition is 50 MPa or less and higher than the Young's modulus of dried film of the ink composition.

2. The set of compositions according to claim 1 for ink jet textile printing, wherein
    the Young's modulus of dried film of the ink composition is from 1 to 20 MPa.

3. The set of compositions according to claim 1 for ink jet textile printing, wherein
    the Young's modulus of dried film of the ink composition is from 5 to 20 MPa.

4. The set of compositions according to claim 1 for ink jet textile printing, wherein
    the Young's modulus of dried film of the coating composition is higher than the Young's modulus of dried film of the ink composition by 5 to 25 MPa.

5. The set of compositions according to claim 1 for ink jet textile printing, wherein
    the Young's modulus of dried film of the coating composition is from 5 to 50 MPa.

6. The set of compositions according claim 1 for ink jet textile printing, wherein
    the resin particles contained in the ink composition contain a resin having at least one crosslinking group.

7. The set of compositions according to claim 6 for ink jet textile printing, wherein
    the crosslinking group includes any of a blocked isocyanate group and a silanol group.

8. The set of compositions according to claim 1 for ink jet textile printing, wherein
the resin particles contained in the ink composition contain a urethane resin having a polycarbonate backbone.

9. The set of compositions according to claim 1 for ink jet textile printing, wherein
an amount of the silicone resin particles in the coating composition is from 0.1% to 10% by mass, on a solids basis, of a total amount of the coating composition.

10. The set of compositions according to claim 1 for ink jet textile printing, wherein
the ink composition or coating composition further contains a lubricant.

11. The set of compositions according to claim 10 for ink jet textile printing, wherein the lubricant contains a lubricant wax.

12. The set of compositions according to claim 1 for ink jet textile printing, wherein
the coating composition is a composition for being applied to a recording medium by dipping.

13. A method for ink jet textile printing, the method comprising
a step of attaching the ink and coating compositions included in a set of compositions according to claim 1 for ink jet textile printing to a recording medium including a fabric.

* * * * *